(12) United States Patent
Kanevsky et al.

(10) Patent No.: US 6,393,470 B1
(45) Date of Patent: May 21, 2002

(54) NON INTRUSIVE AUTOMATIC REMOTE SUPPORT FOR FREEING OVERLOADED STORAGE IN PORTABLE DEVICES

(75) Inventors: Dimitri Kanevsky, Ossining; Wlodek Wlodzimierz Zadrozny, Tarrytown, both of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/225,800

(22) Filed: Jan. 5, 1999

Related U.S. Application Data
(60) Provisional application No. 60/108,250, filed on Nov. 13, 1998.

(51) Int. Cl.⁷ .............................................. G06F 15/16
(52) U.S. Cl. ...................... 709/219; 709/211; 709/216; 709/248
(58) Field of Search ................... 709/219, 203, 709/201, 217, 218, 206, 212, 222, 226, 229, 231, 211, 216, 227, 232, 237, 248

(56) References Cited

U.S. PATENT DOCUMENTS

| | | | |
|---|---|---|---|
| 4,019,174 A | * | 4/1977 | Vanderpool et al. |
| 5,737,328 A | * | 4/1998 | Norman et al. ............. 370/331 |
| 5,737,491 A | * | 4/1998 | Allen et al. |
| 5,801,664 A | * | 9/1998 | Seidensticker et al. ........ 345/2 |
| 6,061,733 A | * | 5/2000 | Bodin et al. ................ 709/233 |

FOREIGN PATENT DOCUMENTS

| | | |
|---|---|---|
| JP | 09-307794 | * 11/1997 |
| JP | 10-056612 | 2/1998 |
| JP | 10-150523 | 6/1998 |
| JP | 10-164251 | 6/1998 |
| JP | 10-294967 | 11/1998 |
| JP | 2000-134522 | 5/2000 |

OTHER PUBLICATIONS

N. Jayant, "High–Quality coding of Telephone Speech and Wideband Audio", Advanced in Speech Signal Processing, pp. 85–109.
J. Storer, "Data Compression: Methods and Theory", Computer Science Press, 1993, pp. 55–61.
L&H Speech Technologies Division, Automatic Speech Recognition (ASR) Development Tools, http://www.1hs.com/speechtech/embddevtools/.
Digital Solution Corp., www.digital–solution.com, "What's Inside: Learn the Process".
Electric Pen, http://www.execpc.com/~catrina/pen/.

* cited by examiner

*Primary Examiner*—Ario Etienne
(74) *Attorney, Agent, or Firm*—Louis J. Percello; Fitch, Even, Tabin & Flannery

(57) ABSTRACT

A non intrusive method for freeing storage of portable devices (such as digital video cameras) when the portable device becomes full. This task is accomplished using a network of servers that communicate via wireless channels with the portable devices (like cameras) within the zones of these servers. That is, if a server detects that a camera (or other device) is near full with stored captured images (data), or meets some other criteria, this server moves stored images (data) to a storage server without interrupting possible owner actions with the camera/device. The owner can download all moved images/data from a storage server to his/her computer after returning to a home/office/hotel. Similar non intrusive services can be provided for other miniature devices with embedded storage that are using by owners during some their activities (like palmtops, tapes, smart phones, wrist watches etc.).

60 Claims, 6 Drawing Sheets

NON INTRUSIVE AUTOMATIC REMOTE SUPPORT FOR FREEING OVERLOADED STORAGE IN PORTABLE DEVICES

The present application claims priority to U.S. Provisional application 60/108,250 filed Nov. 13, 1998.

FIELD OF THE INVENTION

The invention relates to storage in devices with embedded chips. More specifically, the invention relates to freeing storage in (video) cameras, palmtops, tapes, wrist watches.

BACKGROUND OF THE INVENTION

More and more, computer devices are becoming portable and perform functions that are personal to a mobile user. Examples of these "personal computers" include: video cameras, tapes, palmtops, wrist watches, and personal digital assistants (PDAs). Though convenient, these personal computers have limited storage capabilities requiring that their memories be downloaded frequently.

For example, a digital camera acquires and stores digital images. Digital cameras have relatively small space for storing captured images (currently, about 1 MB of RAM, increasing every year). This is usually enough to store for several dozen pictures. When a digital camera is full its owner should download stored images into his/her computer or replace a camera's storage (if it is removable) with a new camera storage disk. In order to access owner's computer s/he should either come to a place where this computer located or call this computer and download images over modem line. A general description of digital camera can be found on internet (www.digital-solution.com).

Both solutions are not convenient, since it is not always possible for a person to interrupt his/her activities (e.g. a tourist trip) to get to a computer or a telephone. Another problem with downloading images over telephone is that it is relatively slow and therefore a user requires some relatively long amount of time connected to a telephone/modem line.

Similar problems occur for other digital devices that people bring with themselves during their travels, walks or other activities (video cameras, tapes, palmtops, wrist watch etc.).

OBJECTS OF THE INVENTION

An object of the invention is an improved system and method for reloading storage in embedded devices such as (video) camera, palmtops, tapes, smart phones, wrist watches.

Another object of this invention is an improved system and method for multitask processing in embedded devices such as (video) camera, palmtops, tapes, smart phones, wrist watches in order a user could continue perform basic functions of these devices while re-downloading their storage.

Another object of this invention is an improved system and method for non intrusive reloading storage in embedded devices such as (video) camera, palmtops, tapes, smart phones, wrist watches.

Another object of the invention is an improved system and method for splitting a portion of information that is stored in an embedded device into two complementary parts—one part of the portion is sufficient to represent a content of the whole portion of information and remains in the embedded device for retrieval in this device, and the other part improves a quality of the first portion of information when it combined with this first portion and is reloaded to a server storage.

SUMMARY OF THE INVENTION

The invention suggests non intrusive method for freeing digital (e.g. video) embedded device, e.g., camera, storage when it becomes full. This is done via servers that communicate via wireless channels with the embedded personal computers, e.g. (video) cameras, when their owners are positioning themselves in zones of these servers, for example walking/staying there. A special server periodically reads data from the embedded personal computer in its zone (physical distance) that indicate how full the storage is. If a server detects that some embedded personal computer, e.g. (video) camera, is near full, e.g., with stored captured images, the server checks the owner instructions in the embedded personal computer.

These owner instructions determine what information (e.g. on what pictures and how many) can be moved from the memory, an address of a server storage where they can be moved, and/or an e-mail or other owner address for notification of the owner about a location of moved pictures. These instructions can either contain a request to ask the user permission for reloading pictures or give permission for such reloading without asking him/her.

If owner instructions permit, this server moves stored images to a storage server (without interrupting possible owner actions with the (video) camera). The server moves to a storage server information/pictures that were marked by a user following to instructions stored in the camera. Together with pictures the server can download additional descriptive information that was associated with information/pictures and stored in the embedded personal computer (video) camera)—for example, time at what pictures were produced. If the user left more complex information about pictures (for example, geographic description, names), this information is also loaded in the storage server.

This reloading can be done non intrusively for the owner, i.e. the owner can continue his/her usual activities with (video) camera (e.g. take new pictures) while it is reloading. The owner can download all moved information/images from a storage server to his/her computer after returning to a home/office/hotel.

While this disclosure primarily uses a digital camera as a non limiting example, similar non intrusive services can be provided for other miniature devices with embedded storage that are using by owners during some their activities (like palmtops, tapes, wrist watches etc.).

BRIEF DESCRIPTION OF DRAWINGS

The foregoing and other objects, aspects and advantages will be better understood from following detailed description of preferred embodiments of the invention with reference to the drawings that are include the following.

DETAILED DESCRIPTION OF THE INVENTION

Figure 1:
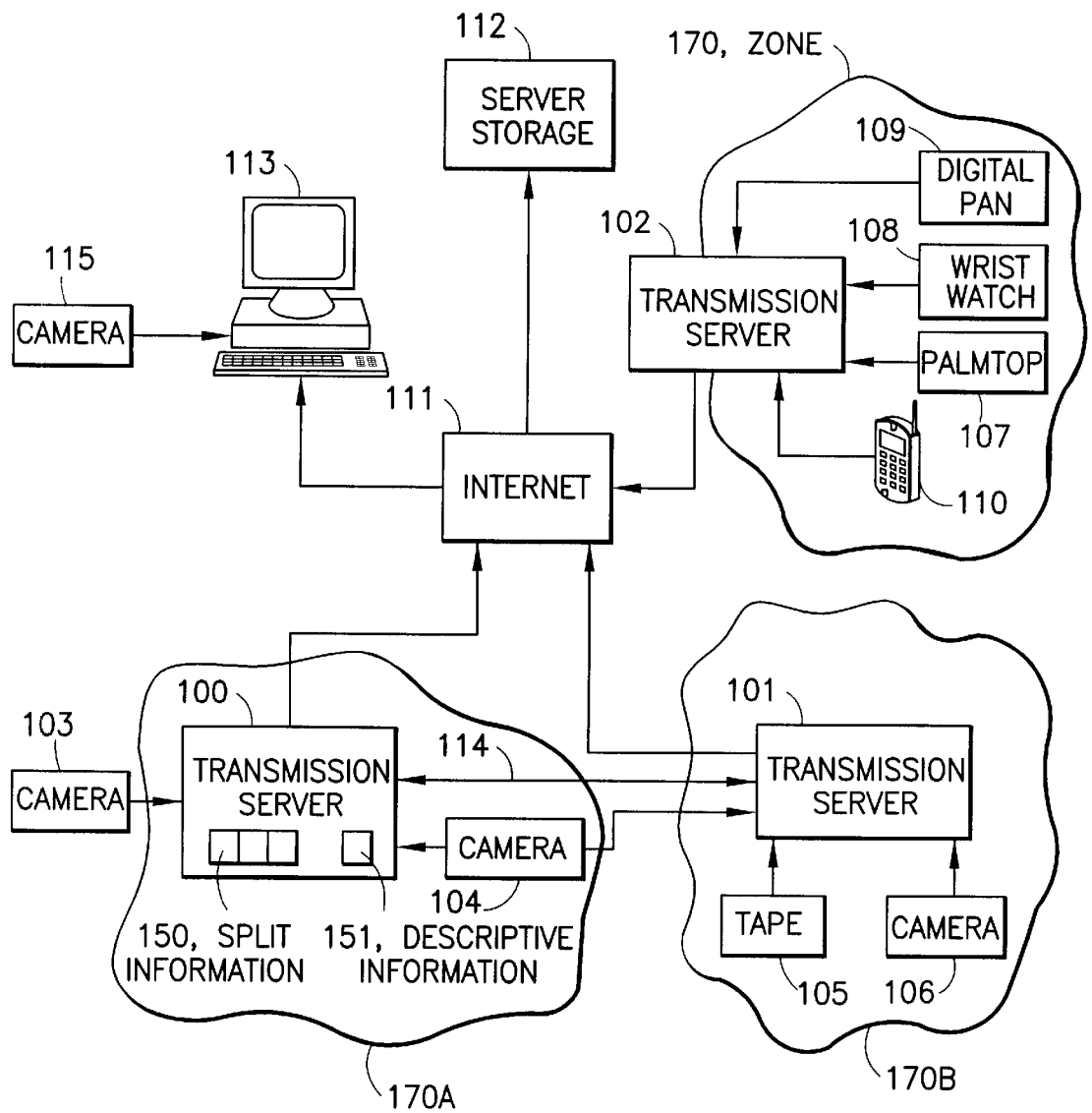
FIG. 1 is a general block diagram illustrating non intrusive system architecture for providing a service for acquiring and/or reloading data in (video) cameras and other embedded personal computer devices.

With reference now to the figures and in particular to FIG. 1, there is illustrated a network of servers. The servers can communicate over any known network 111, i.e. the internet, an intranet, and/or a telephone network. Here, one or more of the servers, typically (102), communicates with one or more embedded personal computers, typically (109). The servers (102) cane communicate via cellular channels (or radio or infrared connections) with embedded wearable devices (109) in accordance with the method and system of the present invention.

Typically the network system include the following objects: transmission servers (100,101,102), network/Internet (111) and a server storage (112). Transmission servers can send and receive radio signals to portable devices that are equipped with cellular transmitters (like cellular telephones). FIG. 1 shows the following examples of portable devices (109) equipped with cellular transmitters: cameras (103, 106), a video camera (104), a smart phone (110), a tape (105), a palmtop (107), a wrist watch (108), a digital pen (109). These devices can communicate different kind of information—digital, analog, video, audio, textual, voice, still pictures etc. These devices can be used by people that are located in zones of transmitter servers. People can either walk with cameras, or sit in their offices with tapes, wrist watches etc. Typically, a zone (typically 170) is the physical distance in which the transmission server (102) can communicate with the embedded personal computer (109).

Figure 3:
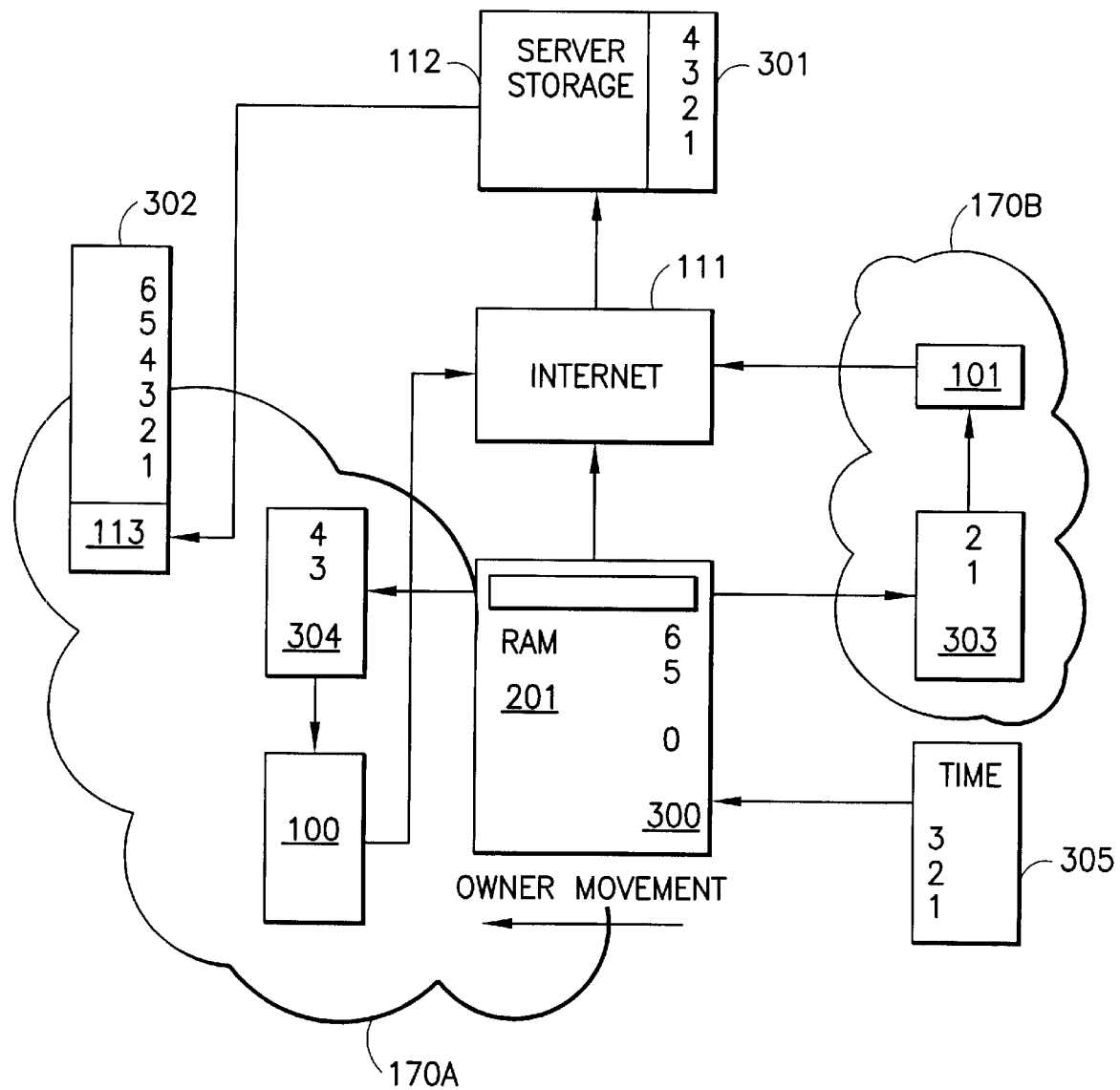
FIG. 3 is a flow chart showing some steps in a acquisition and/or reloading procedure.

Different server transmitters have different zones that can overlap. FIG. 1 shows as an example that a camera (103) is in a zone of a server (100), a tape (105) is in a zone of a server (101), a smart phone (110), a palmtop (107), a pen (109) and a wrist watch (108) are in a zone of a transmitter server (102). A video camera (104) is in zones of both servers (100) and (101). If a device happens to be located in overlapping zones of transmitter servers these servers interact between themselves (link 114) in order to establish the order in what data is downloaded from this device. FIG. 3 gives examples of such interactive protocol.

Locations and zones for transmitter servers can be chosen in the same way as cellular transmitters for cellular phones. In a preferred embodiment, transmitter servers are connected with an Internet backbone 111 . This link allows to servers to interact between themselves (for example, if they have overlapping zones) or communicate with a server storage (112). A user can search and request for some information/pictures (in some cases partitionable) 150 downloaded in a storage server (112). A server storage (112) can communicate with the user's PC 113 via Internet (111). A special integrated program running in the PC (113) put together pictures from the storage server (112) and a camera 115 (that is connected to PC 113) in a correct chronological order (see for a detailed example FIG. 6) or in accordance with other user instructions (for example, in accordance with picture topics or other stored descriptions ).

Figure 2:
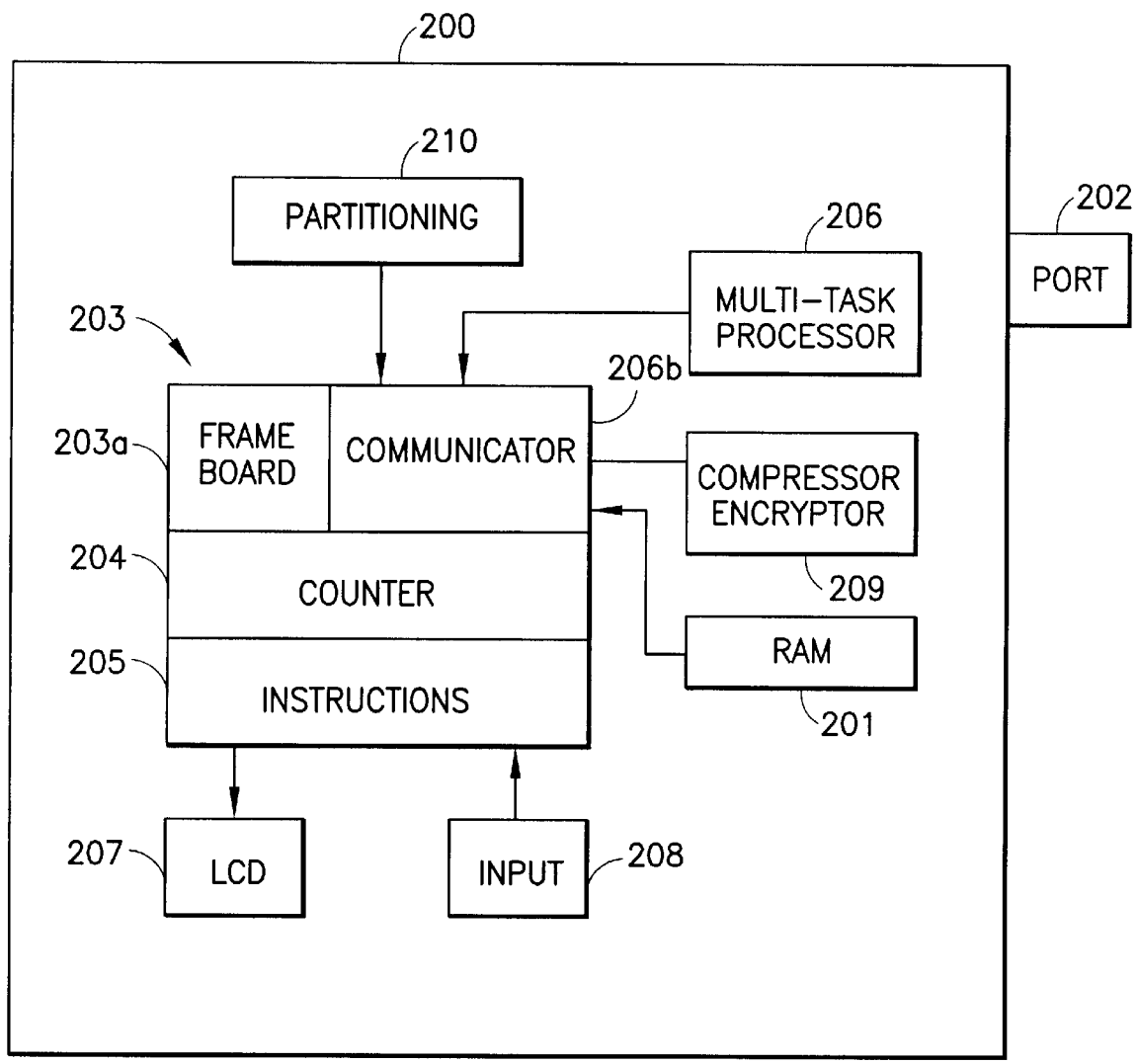
FIG. 2 is a drawing of an example embedded personal computer device, i.e. a camera, with some components that allow remote non intrusive data reloading.

With reference now to FIG. 2, there is illustrated a partial portion of a camera (or other embedded personal computer) in accordance with the method and system of the present invention. A camera (200) contains a flash memory (RAM) (201) in which pictures are stored and a board (203) and a communication port (202) through which data is sent over communication (wireless) channels. The board (203) contains two parts: a frame component 203a (that produces frames from captured images and stores them in 201) and a communication component (203b) that is responsible for selecting and sending frames from (201) to the communication port (202). In one preferred embodiment, the board (203) occupies 8 MB of a space.

The same arrangement can be done for other devices that have frame grabber and/or other input devices (208). For example, a pen input can be achieved using all of the same components of FIG. 2 where the input (208) is a well known pen/template input device. Alternatively, the pen (208) can have a small ball at its end that allows to record user writings when the pen(s) is pressed on a paper and/or electronic template (208). This recorded data can be stored in pen's memory (201) the same arrangement as it was described for the camera.

Tasks that are performed by the frame component (203a) can be performed in a space that is occupied by the communication component (203b) if the camera is not reloading its data to a transmitter server (102). If in a given moment a camera reloads data from (201) to a transmitter server (102) than the frame board uses a part of the communication component (203b). Conversely, if a camera is not capturing images at a given moment and is reloading data than the communication component uses a space from the component. A multitasking processor (206) provides sharing of a space from (203) for frame processing and frame reloading tasks.

Another counter/memory monitoring model (204) counts how much space is occupied in RAM (201). This information is used by the communication component (203b) in order to decide whether to start to download data from (201) to a transmitter server. Typically data is required to be reloaded if more than 80% of RAM (201) is already occupied by information/pictures. In this case, the communication component (203b) sends a warning signal from the port (202). When some transmitter server (102) within the zone gets this warning signal it can start to reload data from (201). Another scenario is possible in which a transmitter server periodically contacts this camera (200) and reads information stored in the counter/memory monitor (204). If it reads in the counter (204) that RAM (201) is overloaded it starts a reloading procedure.

A module (205) contains optional instructions 400 (provided by a user, below) concerning data transmission (for example, which pictures should not be removed from RAM 201, e-mail address where reloaded pictures should be stored etc.) These instructions are introduced by a user from input device 208 (see FIG. 4 for details) and can be displayed on a liquid crystal display (LCD) 207 of the camera (200). The data that is sent from RAM (201) via port (202) can be compressed and encrypted in an optional compression/encryption module (209). In general, the type of compression depends on the type of data. For textual objects (e.g. user instructions) the compression that is relevant to texts is used. (see for example, James A. Storer, Data compression, methods and theory 1993, Computer Science Press). The voice data (e.g. in the case of video-camera) can be compressed, for example, using coding technique that is described in a paper by Niki Jayant, "High-Quality Coding of Telephone Speech and Wideband Audio", in Advanced in Speech Signal Processing, edited by Sadaki Furui, M. Mohan Sondhi, 1991. These references are incorporated by reference in their entirety.

The module (210) partitions information (that is sent to RAM 201 from 203a) into portions of information. Further, additional descriptive information (151 in FIG. 1) can be provided with the information containing content. For example, identifiers can be used to characterize portions of information. Portions of information can be characterized by their types (video, audio, textual, digital, analog, music, clean, noise, color etc.). These labels can be provide by the input device specific to the information type. For example, a microphone driver can identify some information as audio.

Some portions of information either labeled as movable or as not movable. In the simplest case, a clock input identifies different portions of information are different data (e.g. snap shots) that were captured by the portable device at different times. In a more complex case, the captured image can be divided into two portions—one portion that represents the picture with low quality—is stored in RAM (201) in order that a user could retrieve this picture. The other portion that is complement to this picture will be sent to a server when the camera will be overloaded. This complement portion can be used later to reconstruct a full quality picture after it is integrated with a corresponding portion that was stored in RAM (201).

For example, a first portion from the picture can contain every 4th pixel along both coordinate axes. This would give a picture of a relatively low quality, but still recognizable by the user. This portion of picture require less storage than a full picture and can be stored in RAM (201). The other portion of picture would contain other pixels and can be stored in RAM (201) temporally until it is sent to a server (102). These both parts of the picture can be integrated when the user connects the camera to a client server and the server retrieves portion of information that are stored in the camera and downloads corresponding portions of information that were earlier sent to servers. The partitioning module (210) also indexes portions of information and stores this information in RAM. These indexes helps to relate stored information portions to their corresponding parts. For example, portion of information that will be sent to a server are numerated and these numbers are stored with corresponding portions in RAM (201). To retrieve the matching portion in subsequent integration process one can send the stored index number to a server (from the client). More complex indexes are possible that indicate a configuration of different portions of information.

Note that similar partitioning and indexing of portion of information can be done with any type of data (e.g. audio and video data in a video camera).

The function of partitioning (210) of data can be partly executed not in the embedded device (200) but in a central transmitting server, e.g. (102). Execution of this function by a server (102) rather than by the embedded device makes sense if there is not sufficient embedded computer power to perform the whole partitioning procedure. For example, a time and date stamp can be provide as additional descriptive information by the transmitting server (102).

If the partitioning (210) is performed by a server, than this server (102) obtains a copy of a whole portion of information from the embedded device (109). Then this whole portion is split into parts according some criteria in the server. These criteria can require that parts of portions were complementary. For example, the first part should be sufficient to represent a content of the whole portion and the second part should contain an additional data that is needed to reconstruct the full portion of information.

The following is one non limiting example illustrating this principle. Pictorial data in a camera is split into portions that correspond to different pictures (captured at different times). This partitioning of data in portions is done naturally in the camera (this is a part of the camera processing and does not require additional computer power). These portions of data are copied to a remote server. For each such portion of data the server computes two sub-portions—that should remain in the camera and that can be erased.

For example, the first sub-portion can consist of all 4th pixels (along both coordinate axes). The server sends instructions to the camera where one part of the portion stored and another part of the portion erased.

With reference now to FIG. 3, an example of acquiring/reloading data (150) is given when a camera 200 is located in zones of two server transmitters 100 and 101. In this example it is assumed that the owner of the camera is moving from a zone 170 belonging to the transmitter server (101) to a zone (170) belonging to the transmitter server 100. Numeration of frames in (201) corresponds to time scaling (305). While the camera was in a zone (170B) belonging to (101) the camera reloaded picture frames numbered 1 and 2 in RAM 201 to (303)(preserving numeration) in the server (101). When the camera reached a zone (170A) of the server (100) the camera reloaded picture frames numbered 3 and 4 to (304)(preserving numeration) in the server (100). In this example, the camera did not reloaded picture frames numbered 0 and 6 since instructions did not allow to reload these frames. There can be different criteria for the camera communication processor to decide when to switch reloading to another server. These criteria can include the following:

a) Switch to a server that is closest to the camera (usually signals from a camera that received by the closest server are strongest).

b) Order servers in some way and reload data to those server (among reachable servers) that has the highest priority.

c) Transmitter servers can interact between themselves to establish to which one reload data. If some server is busier that another server with reloading from other cameras they can decide (in accordance with their protocol) to give reloading to a less busy server.

Since reloaded (to different servers) frames preserve their numeration they are stored in a server storage (112) in (301) in accordance with their numeration in the camera RAM 201 (1,2,3,4 in our example). When the camera (200) is connected to a user PC (113)(for example, after returning this user to home), all pictures are integrated from the camera (200) and the storage server (112) in the original order 0,1,2,3,4,5,6 (see FIG. 6 for details).

Figure 4:
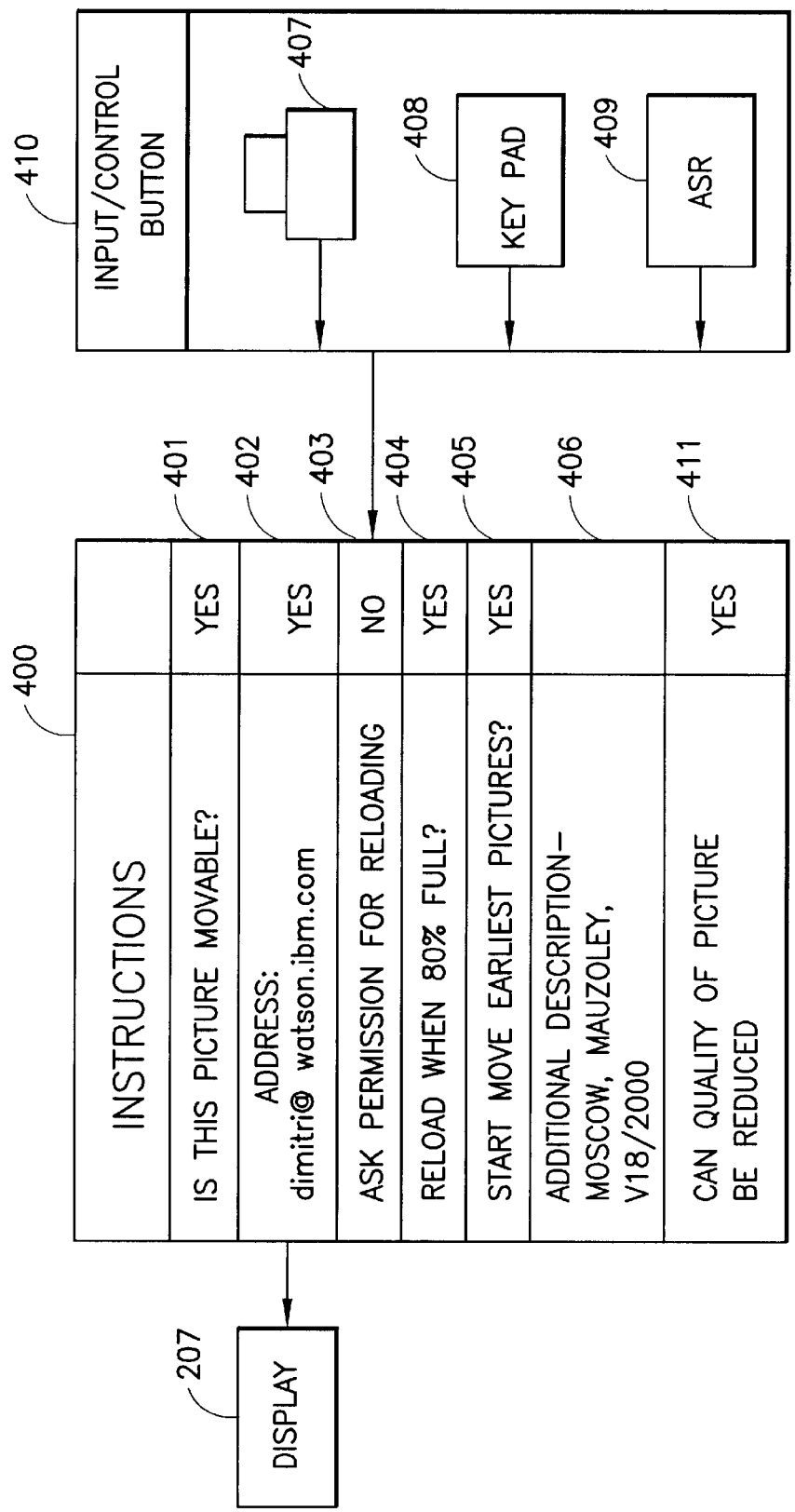
FIG. 4 is an example of an instruction interface for data acquisition/reloading in a camera.

Refer to FIG. 4.

An example of instructions 400 is shown on the LCD (207). A line (401) asks a user whether a given captured picture can be reloaded by a transmitter server. This question can be displayed on LCD each time when the user takes a picture. Since a digital camera allows to view pictures on LCD after they stored in RAM some users may prefer to keep some pictures in their cameras for later viewing.

The right column in the line (401) contains a user answer YES in our example. The next line (402) contains the e-mail address of the user. A transmitter server can use e-mail address of the user to provide an address for reloaded data in a storage server. The right column of the line (402)(YES) shows that the user accepts this kind of the address. The line (403) verifies whether a transmitter server should ask a permission from the user each time when it would like to reload data. The right column in the line (403)(NO) gives permission for non intrusive reloading of data (i.e. a server should not ask a permission from the user for reloading). The line (404) establishes a criteria when RAM is considered full and data should be reloaded. The line (405) requires that reloading was started from pictures that were made earlier. The line (406) contains additional descriptions related to captured pictures (e.g. Moscow, Mavzoley, Jan. 18, 2000). These descriptions can be entered by the user while he capturing pictures. In the line (411) the user is asked whether he agreed to view pictures that are stored in the camera with reduced quality. If the user answered YES (as in our example) than each portion of data corresponding to stored pictures will be split in two parts in such a way that the first part will contain data for a picture of reduced quality and the second part (that allows to reconstruct a picture of full quality later) will be reloaded to a remote server.

A module (410) describes possible ways for the user to provide input data in instructions. Some instructions can be provided with a camera button (407)(e.g. YES/NO answers can be easily entered in this way). More complex answers can be produced with a keypad attached to the camera (408).

And finally, an automatic speech recognition (ASR) embedded in a camera chip is a natural way for inputting user instructions. Similarly can be provided input for other embedded devices (a video camera, palmtop etc.). Description of products for embedded ASR can be found on internet (www.lhs.com/speechtech/embddevtools/asr.asp). One can also use an electric pen for introducing input. Example of use of an electric pen can be found in (www.execpc.com/~catrina/pen/).

Figure 5:
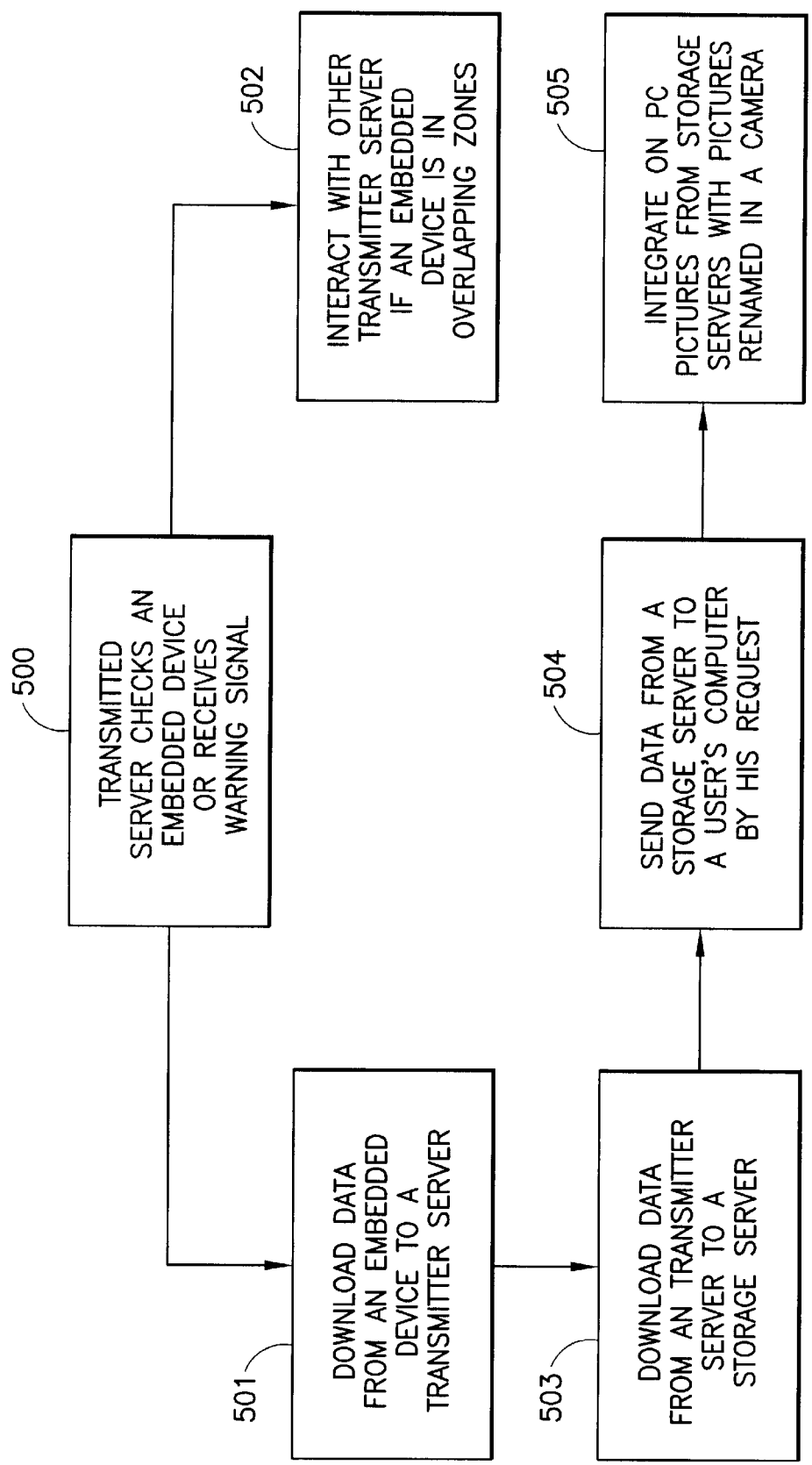
FIG. 5 is a flow chart of a general procedure for acquisition/reloading data.

With reference now to FIG. 5 a general sequence of steps of the process (500) for acquiring/reloading data is described. A transmitter server sends periodically a signal to an embedded device (e.g. a camera)(109) to verify whether its RAM is full. Alternatively, an embedded device can itself send a warning signal to the server to inform it that its RAM is full. In step (501), one of the transmitter server (102) downloads data from the embedded device (when it receives a signal that RAM is full). In step (502), if the embedded device (109) occurs in overlapping zones (170) transmitter servers (102) interact to decide to which server data should be transmitted as described above. In step (503), the data that is stored in a transmitter server (102) is downloaded to a storage server via Internet. In step (504), data that is stored in the storage server (112) is sent to the user computer by his/her request or based on other criteria like time or amount of information (150). Note that step (504) can be omitted if this function is performed by the transmitter server (102). In step (505), data from the storage server (112) and the embedded device is integrated in the user PC in accordance with a chronological order and other description characteristics, for example using the descriptive information (151) and/or instructions (400).

Figure 6:
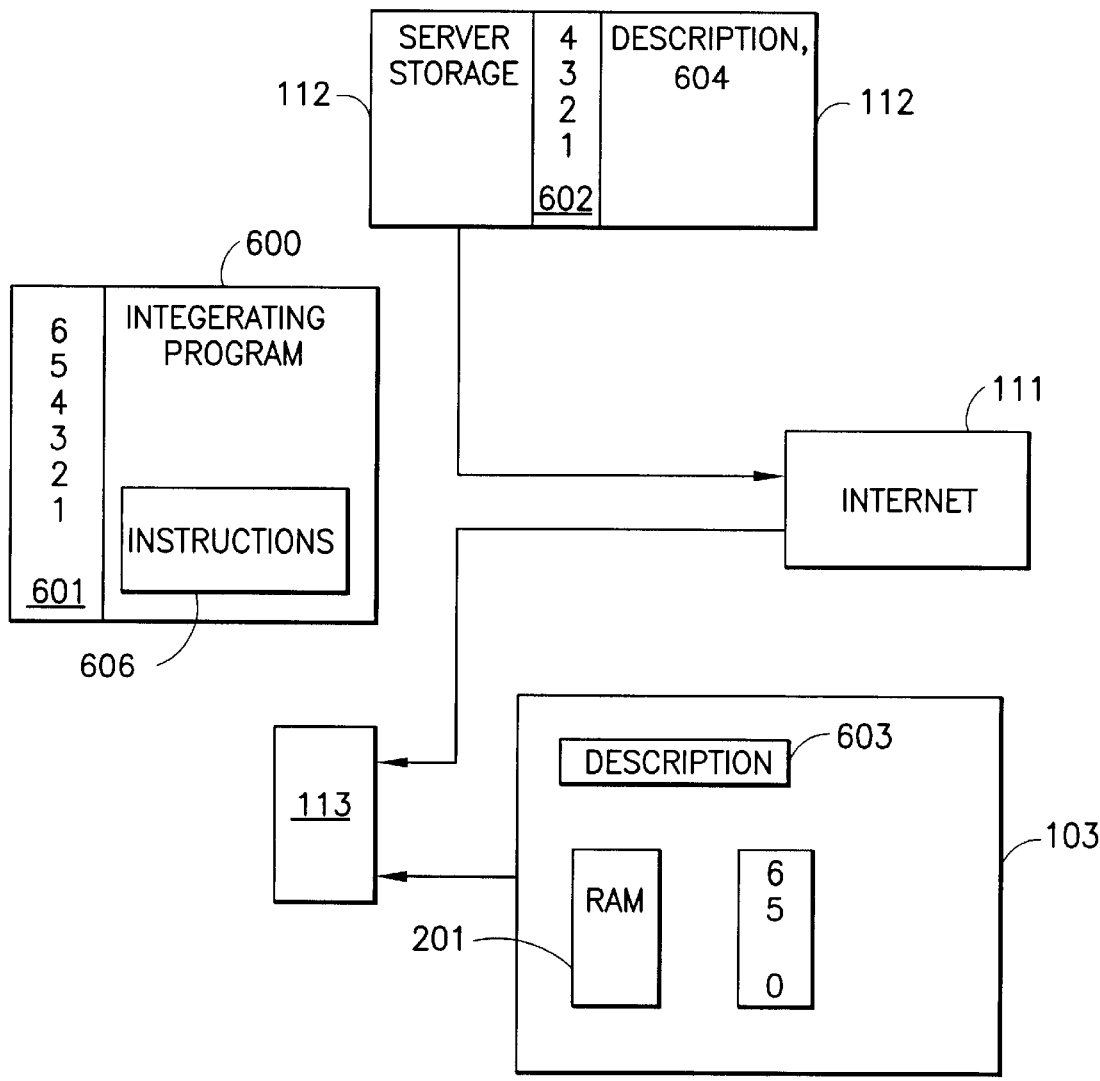
FIG. 6 is an example of integrating pictures from a camera and a server storage in a user computer.

Refer to FIG. 6.

One of the storage server (112) contains loaded information/picture frames (602, 150) in accordance with the order 1,2,3,4 in which these frames (information 150) were stored in a camera (103)(in RAM 201)(before reloading data) and with the description (604) in the right colon of (602). In these descriptions, for example, picture may be required to be grouped in accordance with their topics. In the camera RAM (201) remaining pictures 0,5,6 . . . (that were not reloaded to the storage server 112) are continued to be stored in RAM (201) together with their description (603). The storage (112) is connected with a user computer (113) via Internet (111). The camera (103) can be directly connected to the user computer (113). A program (600) integrates picture frames stored in the storage (602) and in the camera (103) in accordance with their numeration, descriptions and user (606) in the user computer (113). These instructions (400) can require, for example, to group pictures according to their topic descriptions and in each group store pictures following a time scale. In our example two group of pictures numerated as (0,5,6) and (1,2,3,4) were stored in their numeric order 0,1,2,3,4,5,6.

We claim:

1. A portable computing device having one or more memories, one or more central processing units, and one or more inputs capable of storing information in the one or more memories, the portable computing device further comprising:

a communication section that has a communication link established between one or more central servers;

a data structure for data stored in the one or more memories, the data structure having one or more storage criteria values indicating a download criteria for the stored information; and a download process that sends a portion of the stored information through the communication section to the one or more central servers when the criteria value indicates that information stored meets the download criteria and then discards the portion from memory; wherein the portable device performs all other functions without interruption by the download process.

2. A device as in claim 1, wherein the device further comprises:

a compression unit compressing selected portions before downloading to one or more central services.

3. A device as in claim 1, wherein the device further comprises:

an encryption unit encrypting portions before downloading to one or more central services.

4. A device as in claim 1, where the communication link is established by the communication section.

5. A device as in claim 1, where the communication link is established by a server communication section in one of said one or more central servers.

6. A device as in claim 1, where the communication link is selected from a group comprising:

a radio connection; and an infrared connection.

7. A device as in claim 1, wherein the information comprises:

video information;

still pictures;

text; and voice.

8. A device as in claim 1, wherein the device is any one or more of the following: a video camera, a digital camera, a palm top, a clock, a watch, a telephone, a tape drive, a digital pen.

9. A device as in claim 1, wherein the data structure further comprises one or more descriptions that each describe a corresponding portion of stored information.

10. A device as in claim 9, wherein at least one description indicates that a corresponding portion is removable.

11. A device as in claim 10, wherein only portions indicated as being removable are communicated to the one or more central servers.

12. A device as in claim 9, wherein at least one of said one or more of descriptions associates a time with corresponding portions.

13. A device as in claim 12, wherein portions having a time based description are communicated through the communication section in a time order.

14. A device as in claim 9, wherein at least one of the one or more descriptions indicates a type for corresponding portions.

15. A device as in claim 14, wherein portions having a type based description are communicated through the communication section in a type order.

16. A device as in claim 9, wherein a plurality of the one or more descriptions indicates a priority for corresponding ones of said one or more portions.

17. A device as in claim 16 wherein portions having a type based description are communicated through the communication section in a priority order.

18. A device as in claim 9, further comprising an ordering process that orders two or more portions according to the one or more descriptions.

19. A device, as in claim 1, wherein the one or more inputs include one or more of the following: a button, a key pad, an automatic speech recognition system, an electric pen.

20. A device as in claim 1, further comprising a segmentation and partitioning unit that divides stored information into portions.

21. A device as in claim 20, different portions representing different stored information obtained at different moments.

22. A device as in claim 20, wherein selected portions of stored information are complementary with other portions.

23. A device as in claim 20, further comprising a labeling unit marking selected portions of information for storage in memory and other portions for communication to servers through the communication section.

24. A device as in claim 20 further comprising an indexing unit indexing different positions of information and storing indexes in said one or more memories.

25. A device as in claim 20, wherein multimedia information is divided according to data type.

26. A device as in claim 25, wherein the data types include audio, video, textual, pictorial, digital, analog, music, clean, noise and color.

27. A device as in claim 20, wherein stored information of one type is divided according to quality.

28. A device as in claim 27, wherein quality comprises: a number and order of pixels in video images, a number and order frames in audio data, a size of a video image and volume of audio data.

29. A device as in claim 27, wherein image portions stored in memory provide a recognizable image on the portable device.

30. A device as in claim 29, wherein corresponding portions moved from the portable device through the communication section to servers are integratable with images stored in memory to recover an original image quality.

31. A device as in claim 1, further comprising an integration unit compiling full information from portions of information stored in memory and from corresponding portions downloaded through the communication section from one or more central servers when a device storage limit indicates that there is enough space in device memory.

32. A device as in claim 31, wherein indexes to a portion of information in the one or more memories are used to integrate with information from the one or more central servers.

33. A device as in claim 1, further comprising a picture making unit making a picture from a portion of information and storing the picture in the memory.

34. A computer system comprising:
   a portable computing device having one or more memories, one or more central processing units, and one or more inputs capable of storing information in said one or more memories, the portable computing device further comprising:
      a communication section establishing a communication link to one or more central servers,
      a data structure for data stored in the one or more memories, the data structure having one or more storage limit values indicating a memory limit for the stored information, and
      a download process that sends a portion of the stored information through the communication section to the one or more central servers when stored information exceeds the memory limit and then discards the sent portion from memory, wherein the portable device performs all other functions without interruption by the download process; and wherein
   said one or more central servers each having one or more server central processing units and one or more server memories, each central server further comprising:
      a server communication section capable of communicating with the communication section of said portable computing device and receiving information through the server communication section, and
      a server storage process storing downloaded information in the one or more server memories.

35. A computer system as in claim 34, further comprising a segmentation and partitioning unit in the one or more central servers dividing information stored in one or more portable devices into portions.

36. A computer system, as in claim 35, wherein a plurality of different portions represent information obtained from a single source at different moments.

37. A computer system as in claim 35, wherein different portions of information are complementary.

38. A computer system as in claim 37, further comprising a labeling unit marking portions of information for storage in the memory and other portions for communication to servers through the communication section.

39. A computer system as in claim 35, further including an indexing unit indexing different positions of information and storing indexes in said one or more memories.

40. A system as in claim 35, wherein multimedia information is divided according to data type.

41. A system as in claim 40, wherein data types include any of the following: audio, video, textual, pictorial, digital, analog, music, clean, noise and color.

42. A system as in claim 35, wherein stored information of one type is divided according to quality.

43. A system as in claim 42, wherein quality comprises: a number and order of pixels in video images, a number and order frames in audio data, a size of a video images and volume of audio data.

44. A system as in claim 42, wherein image portions stored in memory provide a recognizable image on the portable device.

45. A system as in claim 42, wherein corresponding portions moved from the portable device through the communication section to servers are integratable with images stored in memory to recover an original image quality.

46. A system as in claim 42, wherein the central server further comprises one or more network interfaces that connect to one or more networks.

47. A system as in claim 46, where one or more of the one or more networks include any one or more of the following: the internet, a wide area network, a local area network, the Intranet, a corporate network, a telephone network and a satellite network.

48. A system as in claim 34, wherein the servers communicate with one another to insure that all portions of information communicated are contained in at least one of the server memories.

49. A system as in claim 34, wherein the portions of information are ordered according to identifiers associated with downloaded portions of information.

50. A system as in claim 49, wherein the identifiers include any of the following: a time, an information type, a location, an information priority, a permission for transmission, an owner identifier and an encrypted identifier.

51. A system as in claim 34, wherein the server selectively sends downloaded portions of information to a client connected to the network.

52. A system as in claim 51, wherein the portable device selectively sends portions of the information to the client via a direct link.

53. A system as in claim 52, wherein the client integrates portions received from the portable device with portions received from one or more servers, integrated portions reforming information divided by said segmentation and partitioning unit.

54. A system as in claim 53, wherein the portions integrated on the client are integrated according to indexes that are stored in the portable device.

55. A device as in claim 1, wherein the download criteria is to transmit information as soon as the information is stored.

56. A device as in claim 1, wherein the criteria is a percentage of the memory used.

57. A local storage optimization method for automatically optimizing available portable computer storage, said method comprising the steps of:
   a) selectively storing information on a portable computer;
   b) identifying portions of stored said information as being either downloadable or retained;
   c) determining when said portable computer moves within a server transmission zone;
   d) downloading identified downloadable portions to said server in response to a download criteria wherein the portable computer performs all other functions without interruption by the download; and
   e) discarding downloaded portions from portable computer storage, retained portions remaining in said portable computer storage.

58. A local storage optimization method as in claim 57, wherein in step (b) the stored information is partitioned into identifiable portions.

59. A local storage optimization method as in claim 57, wherein in step (b) the retained portions are extracted from said stored information, remaining stored information being identified as downloadable portions.

60. A local storage optimization system for automatically downloading selected data from portable computer storage, thereby maximizing available local storage on said portable computer, said local storage optimization system comprising:
   a portable computer selectively storing information;
   means for identifying portions of stored said information as being either downloadable or retained;
   means for determining when said portable computer moves within a server transmission zone;
   means for automatically downloading identified downloadable portions to said server in response to download criteria wherein the portable computer performs all other functions without interruption by the download; and
   means for discarding downloaded portions from portable computer storage, retained portions remaining in said portable computer storage.

* * * * *